United States Patent [19]

Jones et al.

[11] 3,903,225

[45] Sept. 2, 1975

[54] PRODUCTION OF BETA ALUMINA CERAMIC

[75] Inventors: Ivor Wynn Jones; Lyndon James Miles, both of Chester, England

[73] Assignee: The Electricity Council, London, England

[22] Filed: Dec. 28, 1971

[21] Appl. No.: 213,204

[30] Foreign Application Priority Data

Dec. 29, 1970 United Kingdom............... 61620/70

[52] U.S. Cl. .................... 264/57; 106/65; 136/153; 264/65; 264/66; 264/82; 264/234
[51] Int. Cl.² .......................................... C04B 35/64
[58] Field of Search ......... 264/65, 66, 82, 340, 234, 264/345, 57; 106/65; 136/153

[56] References Cited
UNITED STATES PATENTS

| | | | |
|---|---|---|---|
| 3,404,036 | 10/1968 | Kummer et al. | 136/153 |
| 3,446,669 | 5/1969 | Arrance et al. | 106/65 |
| 3,446,677 | 5/1969 | Tennenhouse | 106/65 |
| 3,468,719 | 9/1969 | Tennenhouse | 106/65 |
| 3,475,225 | 10/1969 | Tennenhouse | 106/65 |
| 3,488,271 | 1/1970 | Kummer et al. | 264/65 |
| 3,515,679 | 6/1970 | Gaeth et al. | 252/477 |
| 3,535,163 | 10/1970 | Dzieciuch | 136/153 X |
| 3,607,435 | 9/1971 | Charles et al. | 264/65 |
| 3,655,845 | 4/1972 | Chiku | 264/65 |
| 3,707,589 | 12/1972 | Chiku et al. | 264/66 |

*Primary Examiner*—Robert F. White
*Assistant Examiner*—Thomas P. Pavelko

[57] ABSTRACT

In producing beta alumina ceramic by compressing and sintering powder of the appropriate composition or mixture, the material after sintering is subjected to heat treatment at a temperature between 1200° and 1600°C but at least 50°C below the minimum sintering temperature for the composition used. This heat treatment is for at least 1 hour but may be 24 hours or longer and results in an appreciable reductance of the specific electrical resistance of the material. The treatment is carried out in a closed crucible or with the article buffered by a loose powder of substantially the same composition as the ceramic to reduce loss of volatiles.

9 Claims, No Drawings

PRODUCTION OF BETA ALUMINA CERAMIC

BACKGROUND OF THE INVENTION

1. Field of the Invention

This invention relates to the production of solid beta alumina ceramic articles by sintering a compound powder.

2. Prior Art

Beta alumina ceramic is a material having a nominal composition by weight of 5% sodium oxide and 95% alumina although the amount of sodium oxide in practice can range from 5 up to 10%. Up to 5% of magnesium oxide or lithium oxide may also be included in addition to the sodium oxide. The manufacture of such material by compressing a powdered mixture of materials of the appropriate composition and sintering the compressed powder is described for example in U.S. Pat. Nos. 3,404,036 of J. T. Kummer et al. and 3,468,719 and 3,475,225 of G. J. Tennenhouse.

Solid beta alumina ceramic finds applications as a solid electrolyte in certain types of cells, for example sodium sulphur cells, and for the electrochemical recovery of sodium from solutions in other metals. Such cells commonly use long thin-walled tubes of beta alumina ceramic; the tubes must be impervious to helium and have a density which closely approaches the theoretical single crystal value.

In the earlier application Ser. No. 82,718 of I. W. Jones filed Oct. 21, 1970 and entitled "Production of β-alumina ceramic tubes," there is described a method of making beta alumina ceramic tubes comprising the steps of forming a tube of compressed powder of the required composition and then moving this tube through a furnace so that a short length of the tube is raised to the sintering temperature, the tube being continuously moved so that the heated zone is gradually moved along the length of the tube. The powder may be finely divided beta alumina in crystalline form or it may be a mixture of oxides or compounds containing oxides e.g. sodium aluminate or sodium carbonate which together will form on heating required ceramic composition. The sintering furnace described in the aforementioned application is an induction heated furnace and typically the sintering time is less than 2 minutes.

There is a minimum temperature for sintering to occur. This temperature depends on the ceramic composition but may readily be determined empirically. With a high sodium oxide content ( $\geq$ 9%) and/or a high lithium oxide content ( $\geq$ 0.5%), the sintering temperature may be 1600°C or below and thus it is possible with some compositions to carry out the sintering operation at a temperature as low as 1500°C. For some other compositions, the sintering temperature required may be 1700°C or above. As will be explained later, the sintering operation is preferably carried out at a temperature just above but as close as possible to the minimum sintering temperature. Typically the maximum temperature reached in the sintering operation might be 10°C above the minimum sintering temperature.

SUMMARY OF THE INVENTION

We have now discovered that the properties of the beta alumina ceramic are improved if the material is subjected to a heat treatment subsequent to the sintering, this heat treatment taking place at a temperature between 1200° and 1600°C and preferably between 1300° and 1500°C but at least 50°C below the minimum sintering temperature for that composition. This further heat treatment is applicable to ceramic tubes made by the method of the aforementioned application and also to other articles of beta alumina ceramic.

During the sintering operation, if a slow process is employed, loss of sodium oxide occurs preferentially from the surface, tending to leave a skin of porous unsintered material at the surface. This effect is reduced however by the zone sintering process described in the aforementioned application Ser. No. 82,718. Once the sintering is completed, the dense beta alumina material becomes less susceptible to deterioration as a result of loss of sodium oxide. We have discovered that heat treatment after sintering enables the specific resistance of the material to be appreciably reduced; this is of great importance when the material is used as an electrolyte, for example in a sodium-sulphur cell, as the power density depends on the conductivity of the electrolyte. Prolonged heat treatment however is liable to cause discontinuous grain growth but we have discovered that this can be avoided, whilst still obtaining the advantages of heat treatment subsequent to sintering, if this heat treatment is at a temperature at least 50°C below the minimum sintering temperature.

Thus according to the present invention, a method of making an article of beta alumina ceramic comprises the steps of forming the articles of compressed powder of the required composition raising the article to a temperature above the minimum sintering temperature to sinter the compressed powder material and subsequently heat treating the article at a temperature between 1200° and 1600°C but at least 50°C below the minimum sintering temperature for a period of at least 1 hour. The heat treatment may extend to 24 hours or longer. It will be noted that the time for this heat treatment is considerably longer than the sintering time. Rapid raising of the article to the sintering temperature and short exposure to the sintering temperature is desirable in order to keep the grain size small; with rapid heating at the rate of say 200° per minute and exposure to the sintering temperature for only 2 minutes, it is readily possible to keep the grain size as low as 1 micron. The subsequent treatment is preferably below 1500°C in order to avoid grain growth. Also the loss of volatile constituents is less during such heat treatment than during sintering because of the lower temperature involved. Because of the long time however it is preferable to carry out this further heat treatment in a closed crucible and/or with the article covered by a loose powder, preferably a powder of the same composition or substantially the same composition to act as a buffer against loss of volatiles.

The sintering operation must be above the minimum sintering temperature which, as explained above, depends on the composition of the material but is readily determined empirically. This sintering operation would be at a temperature between 1500° and 1900°C and usually would be at a temperature between 1600° and 1700°C. The sintering operation is preferably carried out by zone sintering as described in the aforementioned application Ser. No. 82,718 to minimise surface loss of sodium oxide.

The sample spends only a short time at the maximum temperature. This is important because it is well known that the rate processes which causes grain growth and sintering in ceramic materials increase exponentially with temperature. The maximum temperature is therefore carefully controlled and, in a typical example, the effective sintering region is that part of the length of the tube (known as the hot zone) which has a temperature between T max (i.e. the maximum temperature reached) and T max − 10°C. In a typical furnace this hot zone length might be say 50 mm. The speed of traverse of the tube is preferably such that the material of any part of the tube is in the hot zone for less than three minutes, typically 1 minute.

The subsequent heat treatment must be at a temperature at least 50°C below the minimum sintering temperature in order to avoid grain growth. The maximum temperature for this stage of the process therefore depends on the composition of the material. This heat treatment is at a temperature between 1200° and 1600°C and is preferably at a temperature between 1300° and 1500°C. The lower the temperature the less effective is the treatment. The improvement is still significant at 1250° however and still occurs at 1200°C. Whilst there are economic advantages in keeping the heat treatment temperature as low as possible, the advantages of higher temperatures in increasing the effectiveness are such that typically a temperature of 1450°C is employed. It has been found that no further improvements are obtained by using temperatures above 1500°C. Exaggerated grain growth does not occur even with prolonged heat treatment below 1500°C.

The material is preferably buffered during the heat treatment subsequent to sintering. This prevents the losses which occur in prolonged unbuffered heat treatment; with buffering by unreacted powder of the same composition as the material being treated, a gain of weight may occur. Unbuffered treatment however can be used as the losses do not cause a porous surface layer in material which has previously been sintered right up to the surface. The losses however can cause mechanical deterioration and it has been found that material which has lost over 1% by weight often fractures spontaneously. This is caused by stress build-up following lattice parameter changes which accompany the loss of sodium oxide from the crystal structure.

EXAMPLE

The following quantities of commercially available materials were weighed out − 1620 gm of ground alumina having a medium particle size of less than 1 micron, 371.2 gm of sodium aluminate of unspecified particle size, and 40 gm of magnesium oxide of unspecified particle size. These materials were placed in a rubber lined vibro energy mill containing 10 kg of pure alumina grinding media; these grinding media were solid cylinders 12 mm. long and 12 mm. diameter. The mixture was milled for a period of 48 hours and powder was then separated from the grinding media using a 10 mesh sieve. Tubular samples were then fabricated in an isostatic pressure mould consisting of a 12.7 mm diameter silver steel mandrel centrally positioned in a 19 mm internal diameter polyvinylchloride elastomeric tube. This polyvinylchloride tube was contained in a perforated metal tube so that the annulus between the mandrel and the polyvinylchloride tube was a cylinder of uniform wall thickness. This annulus was filled with the powder prepared as described above which was then compacted into a uniform walled cylinder by subjecting the mould to a pressure of 40000 p.s.i. (276 MN/m$^2$) in a pressure vessel. The pressed compact was then moved from the mandrel, which was tapered slightly (1 part in a thousand) to facilitate such removal. The sample was dried at 200°C, and it was then removed at a uniform speed through an induction furnace in the manner described in the specification of co-pending application Ser. No. 82,718 having a temperature at the centre of the hot zone of 1740°C. The heating zone of the furnace has a length of approximately 150 mm and the tube was traversed through the furnace at the rate of 50 mm per minute. The temperature of the furnace was closely controlled so that the maximum hot zone temperature of 1740°C was about 10°C above the minimum sintering temperature. The effective length of the hot zone (i.e. the region where sintering took place) was about 50 mm and thus the effective time at the sintering temperature was about 1 minute. At the ends of the furnace, the temperature fell off rapidly. The rate of heating of the article as it entered the furnace was greater than 200°C per minute.

After the tube had been sintered, and had passed completely through the induction furnace, it was then heated for 10 hours at 1400°C in a closed magnesium oxide crucible.

Using the technique of the above example, articles of a number of different compositions have been prepared at various zone sintering temperatures as set forth in the accompanying Tables 1, 2, 3, 4 and 5. These Tables show the density of the samples after sintering. They also state the form of the subsequent heat treatment which was either in a closed magnesium oxide crucible or buffered by a powder material consisting of 10% by weight sodium oxide, 5% by weight magnesium oxide, balance alumina powder in a magnesium oxide crucible. In certain examples in Table 4 and 5, however, a slightly different buffering composition was used, the composition being given in the tables. The durations and temperatures of these heat treatments are shown in the Tables.

The tables show the effect of heat treatment on the specific resistance to solid samples of beta alumina ceramic measured at 300°C and also show the weight change during the heat treatment. It will be noted that the heat treatment always gives a reduction in the specific resistance. With some compositions and conditions of treatment, this reduction is very substantial. It will be appreciated that, particularly, as an electrolyte, reduction of resistivity is of great importance since the power density depends on the conductivity of the electrolyte.

It has been found that some compositions of beta alumina ceramic, which crystallise predominantly in the 3-block beta alumina structure as distinct from the 2-block variety, have a particularly large improvement in the conductivity.

Table 1

Effect of Heat Treatment on Na$_2$O - MgO - Al$_2$O$_3$ Ceramic Electrolyte

| Sample No. | Nominal comp. %MgO | Nominal comp. %Na$_2$O | Zone sinter temp. °C | Sample density g cm$^{-3}$ | HEAT TREATMENT CONDITIONS | Spec. resist. before ohm cm | 300°C Spec. resist. after ohm cm | height change % |
|---|---|---|---|---|---|---|---|---|
| 54–4 | 5 | 9 | 1660 | 2.94 | | 5.09 | 4.45 | +0.45 |
| 44–4 | 5 | 10 | 1670 | 3.14 | | 5.05 | 3.78 | +0.31 |
| 60–2 | 4.5 | 10 | 1655 | 2.97 | 1 hr. at 1600°C buffered by 10% Na$_2$O 5% MgO powder in MgO crucible | 9.78 | 5.78 | +0.76 |
| 57–2 | 5.5 | 9 | 1680 | 2.91 | | 6.39 | 4.30 | +0.69 |
| 44a–8 | 5 | 10 | 1720 | 3.07 | | n.m.* | 3.34 | +0.10 |
| 55–2 | 4.5 | 9 | 1750 | 2.87 | | 5.17 | 4.65 | +0.46 |
| 44c–9 | 5 | 10 | 1645 | 3.09 | | 7.75 | 4.27 | –0.60 |
| 44eTK23 | 5 | 10 | 1675 | 3.07 | 10 hrs. at 1550°C in closed MgO crucible | 6.69 | 3.59 | –0.50 |
| 44c–16 | 5 | 10 | 1645 | 3.05 | | 8.18 | 4.69 | –0.65 |
| 44eTK29 | 5 | 10 | 1675 | 3.11 | | 9.34 | 3.69 | –0.59 |
| 44c11a | 5 | 10 | 1650 | 3.07 | | 8.44 | 3.84 | –0.28 |
| 44c15a | 5 | 10 | 1650 | 3.07 | 17¼ hrs. at 1443°C in closed MgO crucible | 7.88 | 3.96 | –0.26 |
| 44c–11 | 5 | 10 | 1650 | 3.07 | | 7.76 | 4.26 | –0.32 |
| 44c–26 | 5 | 10 | 1650 | 3.07 | | 7.48 | 3.61 | –0.36 |

*n.m. = not measured

Table 2

Effect of Heat Treatment on Na$_2$O - MgO - Al$_2$O$_3$ Ceramic Electrolyte

| Sample No. | Nominal comp. %MgO | Nominal comp. %Na$_2$O | Zone sinter temp. °C | Sample density g cm$^{-3}$ | HEAT TREATMENT CONDITIONS | EFFECT OF HEAT TREATMENT 300°C Spec. resist. before ohm cm | Spec. resist. after ohm cm | Weight change % |
|---|---|---|---|---|---|---|---|---|
| 44eTK26 | 5 | 10 | 1645 | 3.11 | | 7.82 | 6.76 | –0.62 |
| 44c–12 | 5 | 10 | 1645 | 3.07 | 67¼ hrs. at 1350°C in closed MgO crucible | 8.31 | 4.25 | –0.29 |
| 44c–16 repeat | 5 | 10 | 1645 | 3.06 | | 4.69 | 4.5 | –0.17 |
| 44a20A | 5 | 10 | 1660 | 3.08 | 18 hrs. at 1350°C in closed MgO crucible | 7.65 | 5.07 | –0.08 |
| 44e4 | 5 | 10 | 1680 | 3.13 | | 6.47 | 4.55 | –0.019 |
| 44b–6 | 5 | 10 | 1665 | 3.04 | 16½ hrs. at 1253°C in closed MgO crucible | 8.01 | 6.29 | 0.00 |
| 29–15 | 2 | 8 | 1740 | 3.04 | 45 hrs. at 1400°C in closed MgO crucible | 17.02 | 14.16 | n.m.* |
| 30–11 | 2 | 8 | 1760 | 2.87 | | 16.28 | 10.7 | n.m.* |
| 28–3–1 | 2 | 8 | 1730 | 2.91 | | 11.31 | 9.73 | n.m.* |

*n.m. = not measured

Table 3

Effect of Heat Treatment on Na$_2$O - MgO - Al$_2$O$_3$ Ceramic Electrolyte

| Sample No. | Nominal comp. %MgO | Nominal comp. %Na$_2$O | Zone sinter temp. °C | Sample density g cm$^{-3}$ | HEAT TREATMENT CONDITIONS | EFFECT OF HEAT TREATMENT 300°C Spec. resist. before ohm cm | Spec. resist. after ohm cm | Weight change % |
|---|---|---|---|---|---|---|---|---|
| 44c–1 | 5 | 10 | 1650 | 3.11 | | 7.48 | 3.48 | –0.36 |
| 44–7 | 5 | 10 | 1760 | 3.13 | | 5.09 | 4.40 | –0.36 |
| 44c–14 | 5 | 10 | 1665 | 2.97 | 1½ hrs. at 1590°C in closed MgO crucible | 7.79 | 5.74 | –0.78 |
| 44c–15 | 5 | 10 | 1660 | 3.05 | | 8.54 | 4.94 | –0.55 |

Table 3 —Continued

Effect of Heat Treatment on $Na_2O$ - $MgO$ - $Al_2O_3$ Ceramic Electrolyte

| Sample No. | Nominal comp. %MgO | Nominal comp. %$Na_2O$ | Zone sinter temp. °C | Sample density g cm⁻³ | HEAT TREATMENT CONDITIONS | Spec. resist. before ohm cm | Spec. resist. after 300°C ohm cm | Weight change % |
|---|---|---|---|---|---|---|---|---|
| 24–27–1 | 2 | 8 | 1810 | 3.12 | | 9.74 | 8.61 | –0.22 |
| 24–12–2 | 2 | 8 | 1750 | 3.17 | | 9.22 | 8.06 | –0.14 |
| 44e–7A | 5 | 10 | 1660 | 3.11 | | 6.9 | 4.3 | –0.37 |
| 44e7 | 5 | 10 | 1660 | 3.12 | 12½ hrs. at 1450°C in closed MgO crucible | 6.87 | 4.22 | –0.30 |
| 44b7 | 5 | 10 | 1660 | 3.03 | | 8.74 | 4.23 | –0.24 |
| 44e11 | 5 | 10 | 1660 | 3.13 | | 7.01 | 4.28 | –0.28 |
| 44c2 | 5 | 10 | 1650 | 3.11 | | 7.08 | 3.43 | –0.18 |
| 44e2 | 5 | 10 | 1680 | 3.13 | | 6.64 | 4.63 | –0.16 |
| 44e2A | 5 | 10 | 1680 | 3.13 | 1 hr. at 1450°C in closed MgO crucible | 6.59 | 4.44 | –0.14 |
| 44e11A | 5 | 10 | 1660 | 3.12 | | 7.59 | 5.05 | –0.15 |
| 44b7A | 5 | 10 | 1660 | 3.04 | | 8.69 | 5.29 | –0.08 |

Table 4

Effect of Heat Treatment on $Na_2O$ - $MgO$ - $Al_2O_3$ Ceramic Electrolyte

| Sample No. | Nominal comp. %MgO | Nominal comp. %$Na_2O$ | Zone sinter temp. °C | Sample density g cm⁻³ | HEAT TREATMENT CONDITIONS | Spec. resist. before ohm cm | Spec. resist. After 300°C ohm cm | Weight change % |
|---|---|---|---|---|---|---|---|---|
| 44e10A | 5 | 10 | 1655 | 3.12 | 4 hrs. at 1450°C in closed MgO crucible | 6.82 | 4.17 | –0.41 |
| 44e14A | 5 | 10 | 1650 | 3.13 | | 7.11 | 4.69 | –0.30 |
| 44c24 | 5 | 10 | 1650 | 3.07 | | 8.46 | 4.37 | –0.89 |
| 44e10 | 5 | 10 | 1655 | 3.11 | 65 hrs. at 1450°C in closed MgO crucible | 6.53 | 4.68 | –1.39 |
| 44c23 | 5 | 10 | 1650 | 3.10 | | 8.42 | 5.05 | –1.48 |
| 44c14 | 5 | 10 | 1650 | 3.05 | | 7.46 | 5.08 | –1.36 |
| 24–4–2 | 2 | 8 | 1790 | 3.13 | 15 hrs. at 1450°C buffered by 8% $Na_2O$ 2% MgO powder in closed MgO crucible | 11.31 | 9.77 | –0.49 |
| 24–15–1 | 2 | 8 | 1860 | 3.06 | | 12.13 | 11.37 | –0.31 |
| 26–14–1 | 2 | 8 | 1730 | 3.17 | | 9.58 | 9.30 | –0.08 |
| 30–21–B | 2 | 8 | 1750 | 3.10 | | 9.82 | 9.40 | –0.12 |

Table 5

Effect of Heat Treatment on $Na_2O$ - $Li_2O$ - $Al_2O_3$ Ceramic Electrolyte

| Sample No. | Nominal comp. %$Li_2O$ | Nominal comp. %$Na_2O$ | Zone sinter temp. °C | Sample density g cm⁻³ | HEAT TREATMENT CONDITIONS | Spec. resist. before ohm cm | Spec. resist. after 300°C ohm cm | Weight change % |
|---|---|---|---|---|---|---|---|---|
| 141–5 | 0.96 | 8.3 | 1600 | 2.99 | | 150.7 | 17.3 | +0.25 |
| 144–3 | 0.96 | 10.4 | 1635 | 3.03 | | 47.2 | 15.5 | +0.08 |
| 144–5 | 0.96 | 10.4 | 1565 | 3.01 | | 54.7 | 16.5 | +0.11 |
| 154–3 | 0.97 | 9.44 | 1630 | 3.04 | | 53.2 | 14.1 | +0.14 |
| 154–5 | 0.97 | 9.44 | 1560 | 3.01 | 4 hrs. at 1425°C buffered by 0.6% $Li_2O$ 9% $Na_2O$ powder in MgO crucible | 64.8 | 17.0 | +0.07 |
| 156–1 | 0.77 | 9.3 | 1680 | 3.07 | | 20.8 | 13.0 | +0.11 |
| 156–3 | 0.77 | 9.3 | 1665 | 3.06 | | 22.2 | 14.1 | +0.10 |
| 101–10 | 0.6 | 9 | 1640 | 3.05 | | n.m.* | 12.6 | +0.04 |
| 27–17–1 | 0.7 | 9 | 1670 | 3.10 | | 15.6 | 11.0 | +0.12 |
| 27–23–1 | 0.7 | 9 | 1700 | 3.08 | | 14.1 | 11.8 | +0.06 |

*n.m. = not measured

We claim:

1. In a method of making an article of beta alumina ceramic comprising the steps of compressing powdered beta alumina ceramic or a powdered mixture of materials which on heating produce a beta alumina ceramic into the shape of the article and then moving this compressed powdered material through a furnace having a heating zone at the sintering temperature, the rate of movement being such that each part of the article, as it is moved into the sintering zone, is heated up to a temperature just above the minimum sintering temperature but between 150° and 1900°C, the heating at a rate greater than 200°C per minute and each part of the article being exposed to the sintering temperature for less than 3 minutes; the improvement comprising the further step of reducing the specific electrical resistance of said article by subsequently heat treating the article at a temperature between 1200° and 1600°C, but at least 50°C below the minimum sintering temperature, for a period of at least 1 hour.

2. A method as claimed in claim 1 wherein the heat treatment after sintering is for a period of at least 24 hours.

3. A method as claimed in claim 1 wherein said heat treatment after sintering is carried out in a closed crucible.

4. A method as claimed in claim 1 wherein said heat treatment after sintering is carried out with the article covered by a loose powder of buffering material to reduce the loss of volatiles.

5. A method as claimed in claim 4 wherein said powder is of substantially the same composition as the article to act as a buffer against loss of volatiles.

6. In a method of producing a tube of beta alumina ceramic comprising the steps of compressing into the shape of a tube powdered beta alumina ceramic or a powdered mixture of materials which on heating produce a beta alumina ceramic and then traversing this tube in its axial direction through a furnace having a heating zone at the sintering temperature, which heating zone is shorter than the length of the tube so that, at any one instance, only part of the tube is raised to the sintering temperature, the tube being continuously traversed through the heating zone, the rate of traverse being such that each part of the tube is heated up at a rate greater than 200°C per minute to a temperature just above the minimum sintering temperature and between 1500° and 1900°C and is at the sintering temperature for less than 3 minutes, the improvement comprising the further step, after sintering, of reducing the specific electrical resistance of said article by heating the article at a temperature of at least 50°C below the minimum sintering temperature for a time of at least 1 hour.

7. A method as claimed in claim 6 wherein the powder is formed of finely divided beta alumina ceramic in crystalline form.

8. A method as claimed in claim 6 wherein the powder is formed from a mixture of 5 to 10% by weight of sodium oxide, 0 to 5% magnesium oxide or lithium oxide and the balance aluminum oxide.

9. A method as claimed in claim 6 wherein the powder is formed from a mixture of alpha alumina and compounds of sodium and of magnesium and/or lithium which together will form on heating the required ceramic composition.

* * * * *